United States Patent [19]
Gessler

[11] 3,833,134
[45] Sept. 3, 1974

[54] SILO DISCHARGING DEVICE

[75] Inventor: Hans Gessler, Aalen, Germany

[73] Assignee: Schwabische Huttenwerke Gesellschaft mit beschrankter Haftung, Wasseralfingen, Germany

[22] Filed: Dec. 20, 1971

[21] Appl. No.: 209,801

[30] Foreign Application Priority Data
Dec. 22, 1970 Germany.............................. 2063140

[52] U.S. Cl.............................. 214/17 D, 222/228
[51] Int. Cl............................................. B65g 65/48
[58] Field of Search....... 214/17 D, 17 DA; 222/228

[56] References Cited
UNITED STATES PATENTS

| | | |
|---|---|---|
| 2,736,461 | 2/1956 | Dueringer et al.......... 214/17 DA X |
| 3,455,470 | 7/1969 | Kanagy et al.................. 214/17 DA |
| 3,606,037 | 9/1971 | Peterson et al................ 214/17 DA |

FOREIGN PATENTS OR APPLICATIONS
1,801,504  5/1970  Germany.......................... 214/17 D Primary Examiner—Robert G. Sheridan
Attorney, Agent, or Firm—Walter Becker

[57] ABSTRACT

A silo discharging device with a rotor in a silo container, which rotor has at least a resilient rotor arm, especially a rotor arm composed of spring leaves, in which the rotor arm extends with all radii of curvature of the rotor arm in a direction opposite to the direction of rotation of the rotor.

31 Claims, 7 Drawing Figures

PATENTED SEP 3 1974
3,833,134
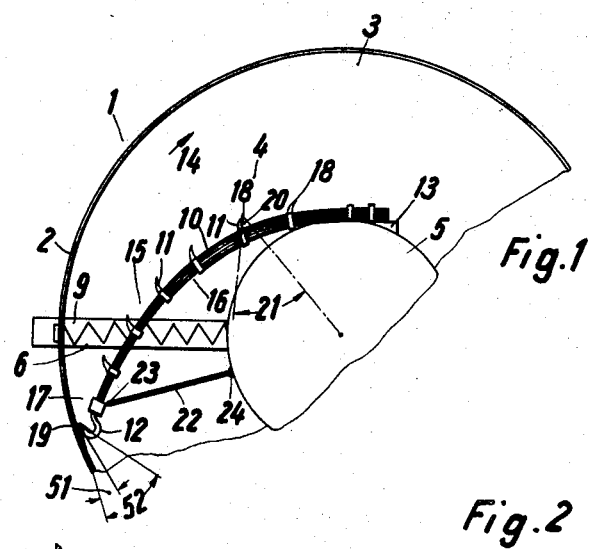
Fig.1
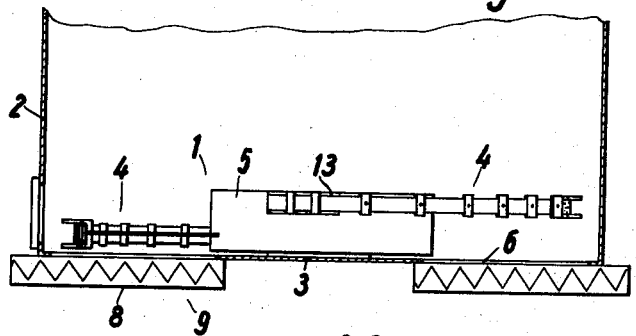
Fig.2
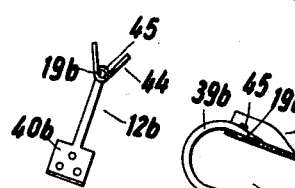
Fig.4
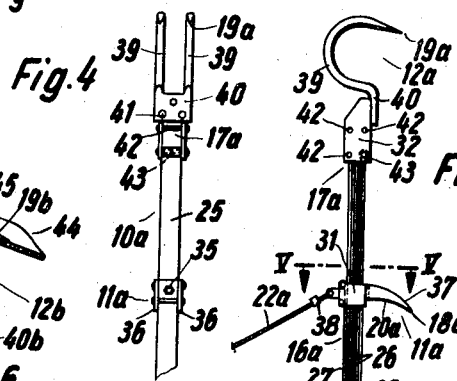
Fig.3
Fig.7
Fig.6
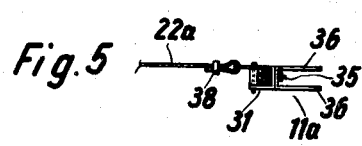
Fig.5
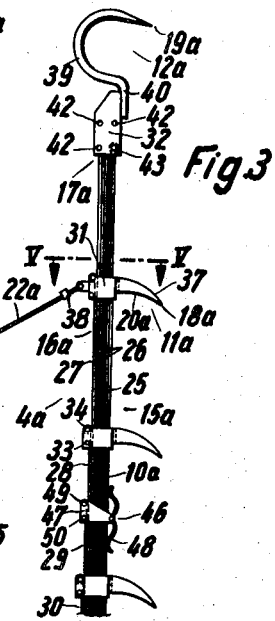

SILO DISCHARGING DEVICE

The present invention relates to a silo discharging device with a rotor arranged in a silo container and comprising at least one projecting resilient rotor arm, especially a spring leaf arm. Such rotor arms are provided in particular for the purpose of loosening up in the withdrawing range of the silo container the column of silo material which is formed by pourable goods, and to feed the silo material to the outwardly leading transporting elements such as worms, belts, shaking troughs, and the like. When the silo container within the range of its rotor is entirely filled with particles of the silo material, the steering arms are loaded by the silo material to such an extent that they curve over its entire length and engage, for instance, the circumference of the rotor part carrying the same. In this way, the torque required for the rotor drive remains within favorable limits.

Due to the fact that the steering or agitating arms which are under radial stresses will, in this load condition, have the tendency to move toward the greatest centrifugal diameter, the ends of said steering or agitating arms will with each rotor revolution dig deeper into the column of the pourable goods in the direction of the silo mantle. As a result thereof, there is formed an arched structure which continuously increases in diameter and which collapse at the latest when the outer annular mantel of the silo material which carries said arched structure has been dug off so that the ends of the rotor arms are close to the mantle of the silo. The agitating or steering arms are so dimensioned that with the maximum possible centrifugal or fly diameter they will still be able to furnish the required digging work. However, they must have sufficient elastic flexibility in order to permit that with the relatively large spring stroke which they have to carry out, the expansion of the individual spring bars will remain within permissible limits.

With rotor arms of heretofore known silo discharging devices this has been realized in an advantageous manner, particularly when the rotor arms are provided for silo containers with small or medium volume. However, there also exists the demand for silo containers with large volume and therefore with larger diameter, for which the heretofore known silo discharging devices are not always feasible.

It is, therefore, an object of the present invention to provide a silo discharging device of the above mentioned general type which will be able to work satisfactorily also under high loads as they may occur, for instance, with silo containers of great diameter.

This object and other objects and advantages of the invention will appear more clearly from the following specification, in connection with the accompanying drawing, in which:

FIG. 1 diagrammatically illustrates a portion of a top view of a silo discharging device according to the invention.

FIG. 2 is a side view of a device shown in FIG. 1.

FIG. 3 shows a top view of the outer end of a modified rotor arm according to the invention.

FIG. 4 illustrates the rotor arm of FIG. 3 as seen from the right-hand side of the drawing.

FIG. 5 is a section taken along the line V—V of FIG. 3.

FIG. 6 represents a top view of a further embodiment of an end blade of a rotor arm according to the invention.

FIG. 7 illustrates the end blade according to FIG. 6 as seen from the right side of the drawing.

The silo discharging device according to the present invention is characterized primarily in that the rotor arm in addition to the smaller centrifugal diameters relative to the maximum centrifugal diameter will also with a maximum centrifugal diameter be curved back to its outer end in a direction counter to the direction of rotation of the rotor. In this way a portion of the load influencing the rotor arm always acts in the longitudinal direction of the rotor so that the rotor arm will also by this load component be subjected to pulling stresses.

In order to realize a high stability of the rotor arm, it is expedient to have the rotor arm preloaded at maximum centrifugal diameter, so that the rotor arm is preferably in relaxed condition approximately straight.

For purposes of realizing particularly favorable conditions, the angle with regard to the axis of rotation of the rotor, over which angle the rotary arm of the rotor will extend at maximum centrifugal diameter will amount to more than 45°, especially more than 90°. In this way it is possible to employ a very low number of rotor arms. Expediently, the curvature of the rotor arm is so selected that the outer rotor arm end will with each rotor arm curvature — relative to the rotor axis — be located radially farthest toward the outside so that the rotor arm end will be effective during the digging operation.

According to a further suggestion of the present invention, there is provided an especially adjustable spacer member for the distance for the rotor arm from the silo mantle so that the rotor arm will at any rate be prevented from contacting the silo container mantle so that damage to the mantle and the rotor arm end and as the case may be also the formation of sparks will be avoided. It is possible as spacer member to employ a spacer member which slides or rolls on the silo or container mantle and which is journalled for instance on the outer rotor arm end. However, it is particularly expedient to form the spacer member by a pulling element which is linked to the rotor arm and a carrier of the rotor arm. Such pulling element may, for instance, be a bendable pulling element, for instance, a steel cable, so that the rotor arm in at least one loading condition, at least at maximum centrifugal diameter is captivated or fixed. In this way, it will also be possible so to arrange the pulling element that it will be taut, not only at the maximum centrifugal diameter, but also at the minimum centrifugal diameter.

According to a further development of the invention, the rotor arm is provided with at least one protruding, especially fork-shaped blade, or cutting edge, preferably a draw blade or cutting edge. Inasmuch as the rotor arm has the tendency to move toward the larger centrifugal diameter these cutting edges or blades are pulled into the silo material so that all advantages of a drawing cut are obtained and in particular the radial compacting of the silo material as it frequently occurs with heretofore known rotor arms will be avoided. The cutting blades may be so designed that at the same time they will be able to function as scraper conveyors.

Expediently, the blades are substantially over the entire length of the rotor arm distributed preferably in a uniform manner so that a high degree of efficiency will be assured. Inasmuch as the rotor arm is curved backwardly in a spiral sectional manner, there is also obtained the advantage that the introduction of the silo material into the outwardly leading conveyor or transporting elements is not effected in a shock-like manner but is distributed over a larger angle of rotation so that an approximately continuous loading and thus a high uniformity with regard to the withdrawal of the silo material will be realized.

The loosening of the silo material is furthermore improved when the blade especially exclusively protrudes beyond that side of the rotor arm which is located in front or forms the leading side.

In order to avoid the rotor arm substantially from being subjected to torsion stresses, the blade is arranged symmetrically with regard to the longitudinal central plane of the rotor arm, which longitudinal central plane extends transverse to the axis of rotation of the rotor.

An increase in the loosening or steering action of the rotor arm is obtained when the blade is designed as a multiple especially claw-shaped double blade or cutting edge. Furthermore, it is expedient to have the cutting edge end with a point so that it can easily enter the silo material. A good entry into the silo material can also be realized when the blade has a concave curved breast surface and/or a convexly curved back surface. Expediently, the arrangement is such that the breast surface or the tip of the blade will substantially with each centrifugal diameter of the rotor arm occupy a positive cutting angle and thereby will still be better pulled into the silo material. All blades may, in a simple manner, with regard to the straight rotor arm be arranged in the same direction.

According to a particularly simple embodiment, the blade is formed by a bent metallic strip, especially the legs, of a U-shaped metallic strip. However, the blade may also be formed by a bent fork or prong, especially a steel wire prong.

According to a further development of the invention, at least one cutting edge or blade, especially the blade provided at the outer rotary arm end is formed by a sickle-shaped or curved blade or in the manner of a harrow extends about an axis which is parallel to the rotary axis so that the outer rotor arm end will with each centrifugal diameter have a favorable entering ability for entering into the silo material. For purposes of increasing this entering ability, the harrow-like blade is curved approximately semicircular so that it can be pulled into the silo material in a hook-like manner. However, it is also possible to design the blades in the manner of a plow so that the blade will divide the silo material and the silo material will pass by on both sides of the blade.

For purposes of increasing the efficiency of the blade, the back surface of said blade is, with maximum centrifugal diameter, together with the silo mantle located in a front clearance angle.

Expediently, the edge or blade at the outer end of the rotor arm protrudes in the longitudinal direction of the rotor arm beyond the latter so that an accumulation of the material in the silo will satisfactorily be avoided within this region.

In order furthermore to reduce the torsion forces acting upon the rotor arm, the edge or blade provided on the outer end of the rotor arm protrudes at a maximum only slightly toward the front beyond that side of the rotor arm which is in the front when considering the rotor turning direction. This front side may also be called the leading side. It is, however, also possible so to arrange this edge or blade that it extends just up to the surface in which the leading side of the rotor arm is located.

According to a further feature of the invention, the entire edge or blade may be exchangeably arranged preferably on a support connected to the rotor arm, for instance by bolts and nuts so that the rotor arm represents a kind of tool carrier to which the specific blades or edges best suitable for the respective silo material may be connected. Expediently, the support for the edge or blade may be formed by a yoke preferably of U-shape, which extends around the spring leaf arm. The edge or blade is so connected to that section of the yoke which is located on the leading side of the rotor arm that the forces acting upon the edge or yoke, for instance tilting moments, will always be absorbed by the entire respective cross section of the spring packet of the rotor arm.

According to a preferred embodiment of the invention, such yokes are by means of bolts on the back side of the rotor arm each safely connected to one of the spring leaves in the longitudinal direction of the rotor arm in such a way that the remaining spring leaves will be able during the bending of the rotor arm to move relative to the respective spring leaf. To assure a safe connection, one bolt, especially the bolt which is located closer to the outer rotor arm end and pertains to the respective yoke, engages the rolled-in end or the like of the pertaining spring leaf so that an articulated mounting of the edge or blade is obtained which will stabilize itself under the load. The yoke of at least one edge or blade, especially the one on the outer end of the rotor arm, is expediently connected to a spring leaf in front of the spring leaf located on the back side of the rotor arm, preferably to that spring leaf which is located on the leading side of the rotor arm and is secured in the longitudinal direction of the last mentioned spring leaf so that when the rotor arm bends backwards, the spring leaves to which the pertaining yoke is not connected will not be pulled out of this yoke but will be pushed into the latter so that the rotor cross section within the region of this yoke will not be reduced at any curvature.

Between at least two edges or blades which are adjacent to each other in the longitudinal direction of the rotor arm there may be provided a cushioning device which will be adapted to compress the leaf during the spring-back of the rotor arm toward the larger centrifugal diameter. Such cushioning device preferably comprises a yoke which is pivotally linked to the back side of the rotor arm and comprises a damping spring mounted on the last mentioned yoke on the front side of the rotor arm so that the rotor arm at a sudden relief will not spring back instantaneously and will not with its edges or blades unduly strongly be pushed into the silo material.

For purposes of obtaining a simple assembly, the silo discharging device is characterized by an insert opening for the rotor arm — the inlet opening being located at the level of the rotor arm — so that the rotor arm can be connected to the rotor support in untensioned condition whereupon by rotating the rotor the rotor arm is curved or bent and pulled into the silo container. Subsequently, the insert opening will be closed.

Referring now to the drawings in detail, FIGS. 1 and 2 show a silo discharging device according to the invention with a rotor 1 which is to be arranged directly above the bottom 3 of a, for instance, cylindrical silo container 2 and in the vertical central axis thereof. The silo discharging device furthermore comprises two diametrically oppositely located rotor arms 4 which are tangentially connected to a rotor support 5 but at different levels. In the bottom 3 of the silo container 2 there are provided radially extending discharge openings 6 below which there are located conveyor troughs 8 of conveying devices 9, for instance, worm conveyors; during the rotation of the rotor 1, the silo material is thrown through the openings 6 into the troughs 8 and is then radially outwardly conveyed.

Each rotor arm 4 is formed primarily by a spring leaf packet 10 which is connected to a support 13 of the support or carrier 5 and tangentially thereto and on which are provided edges or blades 11, 12 which are substantially uniformly distributed over the length of the leaf spring packet 10. The edges or blades 11, 12 protrude beyond the front side 15 of the packet 10 when considering the direction of rotation of the rotor as indicated by the arrow 14. The lengths of the spring leaves of the packet 10 are stepped on the back side 16 of the rotor arm in such a way that the effective cross section of the packet 10 decreases stepwise toward the outer end 17 of the packet 10.

The rotor arm 4 which in relieved or relaxed condition is straight, would in view of its relatively great length in the 1, at which the edge or blade 12 at its outer end is located in sightly spaced relationship to the silo container mantle 2, is curved toward the rear in a direction counter to the direction of rotation 14 of the rotor and thereby is preloaded so that the rotor arm 4 will be pulled into the silo material in container 2 with the edges or blades 11, 12. relaxed condition extend toward the outside through the mantle 2 of the silo container 1 and, in operative condition, also with maximum centrifugal diameter (Flugkreisdurchmesser) according to FIG. AT WHICH THE EDGE OF BLADE - AT ITS OUTER END IS LOCATED IS SLIGHTLY SPACED RELATIONSHIP TO THE SILO CONTAINER MANTLE , IS CURVED TOWARD THE REAR IN A DIRECTION COUNTER TO THE DIRECTION OF ROTATION -$ OF THE ROTOR AND THEREBY IS PRELOADED SO THAT THE ROTOR ARM $ WILL BE PULLED INTO THE SILO MATERIAL IN CONTAINER WITH THE EDGES OR BLADES --, -.

The arrangement of the edges or blades 11, 12 is so selected that their points 18, 19 or breast surfaces 20 will at any operative bending of the rotor arm 4 have a position breast angle 21. The back surface of the end edge or blade 12 forms an acute free angle 51 and an acute cutting angle 52 with the container mantle 2.

In order to keep the end edge or blade 12 in spaced relationship to the silo mantle 2, the rotor arm 4 is captived by means of a pulling element, for instance, a steel wire cable 22 which on one hand is linked at 23 near the end of the rotor arm 4 and on the other hand is linked at 24 to the circumference of the rotor support or carrier 5. The length of the cable is such that when the rotor arm 4 springs forward from a position at which it is bent more than in the position shown in FIG. 1, the end edge or blade 12 will be prevented from beating against the silo container mantle 2. On the other hand, the spacing of the end edge or blade 12 from the silo container wall 2 should be as small as possible. Furthermore, the connecting point 24 of the cable 22 to the rotor carrier 5 is so selected that the cable 22 will be tensioned at the maximum centrifugal diameter of the rotor arm 4 as shown in FIG. 1 and also at the minimum centrifugal diameter at which the rotor arm 4 engages the circumference of the rotor carrier 5. In between-positions the cable 22 may be slightly slack.

According to the embodiment illustrated in FIGS. 3–5, the spring leaf packet 10a of the rotor arm 4a comprises a plurality of spring leaves of which the leaf 25 located on the front side 15a as well as a plurality of directly adjacent spring leaves 26 therebehind extend over the entire length of the packet 10a whereas the spring leaves 27–30 located therebehind are shortened relative to each other so as to form steps. Each of the edges 11a, 12a is by means of a yoke 31, 32 mounted on the packet 10a while the yokes 31 of the edges or blades 11a are formed by bent U-shaped sheet metal plates which in the respective area thereof respectively extend around the entire cross section of the packet 10a by means of rearwardly directed legs and are connected to each other at the back side 16a of the spring leaf packet 10a by means of two bolts 33, 34 located one behind the other in the longitudinal direction of the packet 10a. The respective bolt 34 which is closer to the outer rotor arm end 17a extends into the rearwardly rolled-in end of the respective pertaining spring leaf 27, 28, 29, 20 ending within the region of the bolt so that the bolt will be non-displaceably secured with regard to the pertaining spring leaf in the longitudinal direction thereof and with the circumference of the other bolt 33 will engage the rear surface of the spring leaf. The remaining spring leaves are respectively displaceably passed through the yoke 31 so that the relative longitudinal displacements of the spring leaves which occur during the bending of the rotor arm 4 can be effected unimpededly.

On the transverse web of the respective yoke 31 on the front side of the rotor arm there are provided bolts 35 or threaded bores to which the pertaining edge 11a is exchangeably connected by nuts or screws respectively. The edges or blades 11a are respectively formed by a metal strip bent to a U-shape. The transverse web of this metal strip engages the transverse web of the pertaining yoke 31 and the legs 36 of the yoke protrude beyond the front side 15a of the packet 10a. With the exception of the end edge or blade 12a, all edges or blades 11a are identical and in straight position of the rotor arm according to FIG. 3 are parallel to each other while the breast surfaces 20a of the edges or blades 11a are curved concavely whereas the rear surfaces 37 are curved convexly so that at the tip 18a they merge with each other. In view of this design, each edge or blade 11a has a two-legged double prong. As shown in FIGS. 3 and 5, one of the yokes 31, especially the one adjacent to the outer rotor arm end 17a, may be provided for connection to the captivating cable 22a which latter is expediently adjustable so as to length by means of an adjusting element 38.

The end edge or blade 12a differs from the remaining edges or blades 11a. As will be evident from FIGS. 3 and 4, the end edge or blade 12a is formed by a fork-shaped prong the individual prongs 38 of which have a round cross section and are pointed at the free ends 19a. The individual prongs 39 are slightly spaced from each other by a distance which approximately corresponds to the width of the packet 10a while the edge or blade 12a protrudes beyond the outer end 17a of the packet 10a. In the top view of FIG. 3, the end edge or blade 12a is curved by more than 180° so that its point 19a extends at a slant or incline with regard to the longitudinal direction of the rotor arm 4a and in the operative condition shown in FIG. 1 forms an acute angle with regard to the inner surface of the silo container mantle 2. The end edge or blade 12a is curved backwardly from the connecting area on the packet 10a as formed by the yoke 32 to such an extent that the points 19a protrude only slightly beyond the front side 15a of the packet 10a so that no unfavorable tilting moments can occur in view of the load acting upon the end edge or blade 12a. The two prongs 39 are interconnected by a plate 40 which by means of screws 41 is detachably connected to the yoke 32 or to a section of yoke 32 which section protrudes beyond the outer end of the packet 10a. Yoke 32 is by means of four bolts 42, 43 mounted at the outer end 17a of the packet 10a. Two of these bolts are located at the front side and two of these bolts are located on the back side of the packet 10a. The bolt 43 arranged at the front side 15a and closer to the inner end of the rotor arm is mounted in the outwardly rolled-in end of the front spring leaf 25 so that the end edge or blade 12a is secured relative to spring leaf 25 in the longitudinal direction thereof, and the remaining spring leaves 26 can be displaced in the yoke 32 when the rotor arm bends. When the rotor arm 4a is bent back from its straight position shown in FIG. 3, the spring leaves 26 will in view of the described design slide into the yoke 32 so that always a safe mounting of the yoke 32 will be assured.

The end edge or blade 12b illustrated in FIGS. 6 and 7 has a single curved prong 39b on the connecting plate 40b. This prong 39b is located symmetrically with regard to the longitudinal central plane which is perpendicular to the axis of rotation of the rotor and pertains to the respective rotor arm. Mounted on the conically tapering tip 19b of prong 39b is an edge or blade part 44 which is formed by a sheet metal plate which has a V-shaped cross section and is screwed or welded to the prong 39b. The plow-shaped edge or blade 44 which is located symmetrically with regard to the above mentioned plane of symmetry of prong 39b guides the silo material in such a way that it flows off on both sides along its flanks.

The bolts of yoke 31, 32 may be secured by nuts, rivet heads, cotter pins, spring rings, or welding against axial displacement.

As is furthermore shown in FIG. 3, between the third and fourth edge or blade 11a from the outside there is provided a cushioning device 46a which comprises a yoke 47 which extends around a spring leaf 25, 29 located in this area. That bolt 49 of yoke 47 which is located closer to the outer rotor arm end 17a is pivotally mounted in the rearwardly rolled-in end of the spring leaf 29 located in this area at the back side of the packet 10a, whereas the other bolt 50 loosely engages the rear side of this leaf spring 29. At the front side 15a of the rotor arm 4a the yoke 47 carries a curved cushioning spring 48 which in the longitudinal direction of the rotor arm engages the latter at two areas. When the rotor arm 4a bent back to a relatively small centrifugal diameter suddenly, in view of a relief, springs forwardly, the yoke 47 is in view of the relative displacement of the spring leaves relative to each other so pivoted about the axis of bolt 49 that the cushioning spring 48 is to an increasingly stronger degree pressed against the packet 10a whereby the spring leaves are compressed together to a correspondingly greater extent and in this way the spring-back of the spring leaves is cushioned to such an extent that the edges or blades cannot unduly hardly beat into the silo material.

It is, of course, to be understood that the present invention is by no means limited to the particular showing in the drawings but also comprises any modifications within the scope of the appended claims.

What I claim is:

1. For use in a silo container, a silo discharging device, which includes a rotor having a substantially vertical axis of rotation, resilient rotor arm means connected to said rotor and extending away therefrom while being rotatable together with said rotor, said rotor arm means being bendable from a curvature having a minimum radius of curvature to a curvature having a maximum radius of curvature, and vice versa, said rotor arm means being in all positions of curvature from said minimum radius of curvature to said maximum radius of curvature bent from its area of connection with said rotor in a direction counter to the normal direction of rotation of said rotor, each of said rotor arm means including a plurality of spring leaves having their inner ends forming an eye, a plurality of yoke means straddling all of the spring leaves pertaining to the respective rotor arm means, and bolt means respectively associated with the yoke means and extending through the pertaining eyes of said spring leaves so that in each yoke means one spring leaf is held stationary while the other adjacent spring leaves are movable in the same yoke means.

2. A device according to claim 1, in which the angle over which the curvature of said rotor arm means extends when the latter has its maximum radius of curvature is in excess of 45°.

3. A device according to claim 1, in which the angle over which the curvature of said rotor arm means extends when the latter has its maximum radius of curvature is in excess of 90°.

4. A device according to claim 1, in which said rotor arm means when having its maximum radius of curvature is under a preload while tending in relaxed condition to occupy a substantially straight condition.

5. A device according to claim 1, in which said rotor arm means are substantially tangentially arranged on said rotor.

6. A device according to claim 1, which includes adjustable means operatively connected to said rotor arm means for maintaining the outer ends of said rotor arm means spaced from the inner wall of the silo container in all positions of curvature of said rotor arm means.

7. A device according to claim 6, in which said spacer means includes cable means having the ends thereof respectively connected to said rotor arm means and said rotor.

8. A device according to claim 6, in which said cable means is so arranged that it occupies a taut condition with said rotor arm means having its maximum radius of curvature and also with said rotor arm means having its minimum radius of curvature.

9. A device according to claim 1, which includes prongshaped blade means connected to said rotor arm means and protruding from the latter.

10. A device according to claim 9, in which the blade means protrude beyond the leading side of said rotor arm means.

11. A device according to claim 9, in which the blade means have their front end pointed and arranged substantially symmetrically with regard to the longitudinal central plane extending transverse to the axis of rotation of the rotor.

12. A device according to claim 9, in which said blade means is in the form of a multiple blade.

13. A device according to claim 12, in which said blade means form claw-shaped double blade means.

14. A device according to claim 9, in which said blade means have a concavely curved breast surface and a concavely curved back surface.

15. A device according to claim 14, in which the breast surface at any diameter of curvature of said rotor arm means forms a positive breast angle.

16. A device according to claim 9, in which the blade means are formed by a bent metal strip of a substantially U-shaped contour.

17. A device according to claim 9, in which the blade means are formed by a hardened steel prong.

18. A device according to claim 9, in which at least one blade means is formed by a sickle-shaped blade curved around an axis substantially parallel to the axis of rotation of the rotor.

19. A device according to claim 9, in which at least one blade means is formed by a plow-shaped blade curved around an axis substantially parallel to the axis of rotation of the rotor.

20. A device according to claim 9, in which the blade means is curved substantially semicircularly and has an approximate tangentially extended pointed area while the free end of said blade means includes an element of a substantially V-shape.

21. A device according to claim 20, in which said V-shaped element is detachably connected to the remainder of the pertaining blade means.

22. A device according to claim 9, in which each of said rotor arm means has one blade means connected to the outer end thereof and in which said one blade means forms with the inner wall of said container a free angle and a cutting angle, said angles being acute angles.

23. A device according to claim 22, in which the blade means at the outer end of the rotary arm means protrudes beyond the latter in the longitudinal direction thereof.

24. A device according to claim 9, in which the entire blade means are detachably connected to the pertaining rotor arm means.

25. A device according to claim 9, which includes U-shaped supporting means respectively straddling said rotor arm means and detachably connected thereto, and in which said blade means are respectively connected to said support means.

26. For use in a silo container, a silo discharging device, which includes a rotor having a substantially vertical axis of rotation, resilient rotor arm means connected to said rotor and extending away therefrom while being rotatable together with said rotor, said rotor arm means being bendable from a curvature having a minimum radius of curvature to a curvature having a maximum radius of curvature, and vice versa, said rotor arm means being in all positions of curvature from said minimum radius of curvature to said maximum radius of curvature bent from its area of connection with said rotor in a direction counter to the normal direction of rotation of said rotor, prong-shaped blade means connected to said rotor arm means and protruding from the latter, each rotor arm means having mounted thereon at least two blade means in spaced relationship to each other and damping means arranged between at least two blade means of the same rotor arm means for dampening the spring back of the resilient rotor arm means carrying said damping means.

27. A device according to claim 26, in which said rotor arm means includes at least two rotor arms each in the form of a packet of a plurality of spring leaves.

28. A device according to claim 27, in which the outer end of each rotor arm is at any curvature of said rotor arm located farthest radially outwardly with regard to the axis of rotation of said rotor.

29. A device according to claim 27, in which each of said rotor arms is provided with a plurality of blade means respectively distributed over the entire length of the respective rotor arm and protruding therefrom.

30. A device according to claim 29, in which substantially all blade means of a rotor arm extend in the same direction when said rotor arm occupies a straight position.

31. A device according to claim 26, in which said dampening means includes an undulated spring engaging the leading side of the pertaining rotor arm means.

* * * * *